Patented July 2, 1940

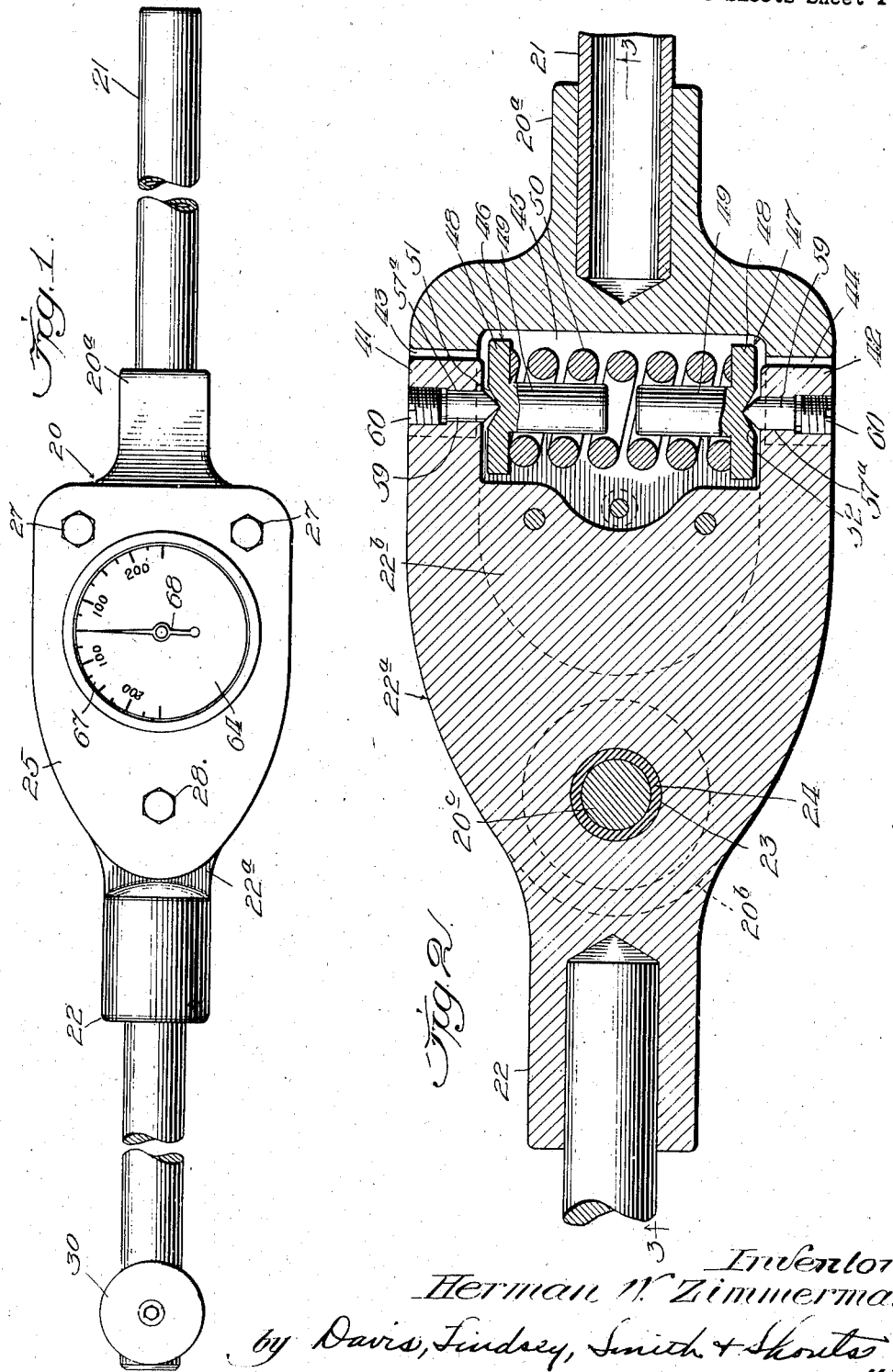

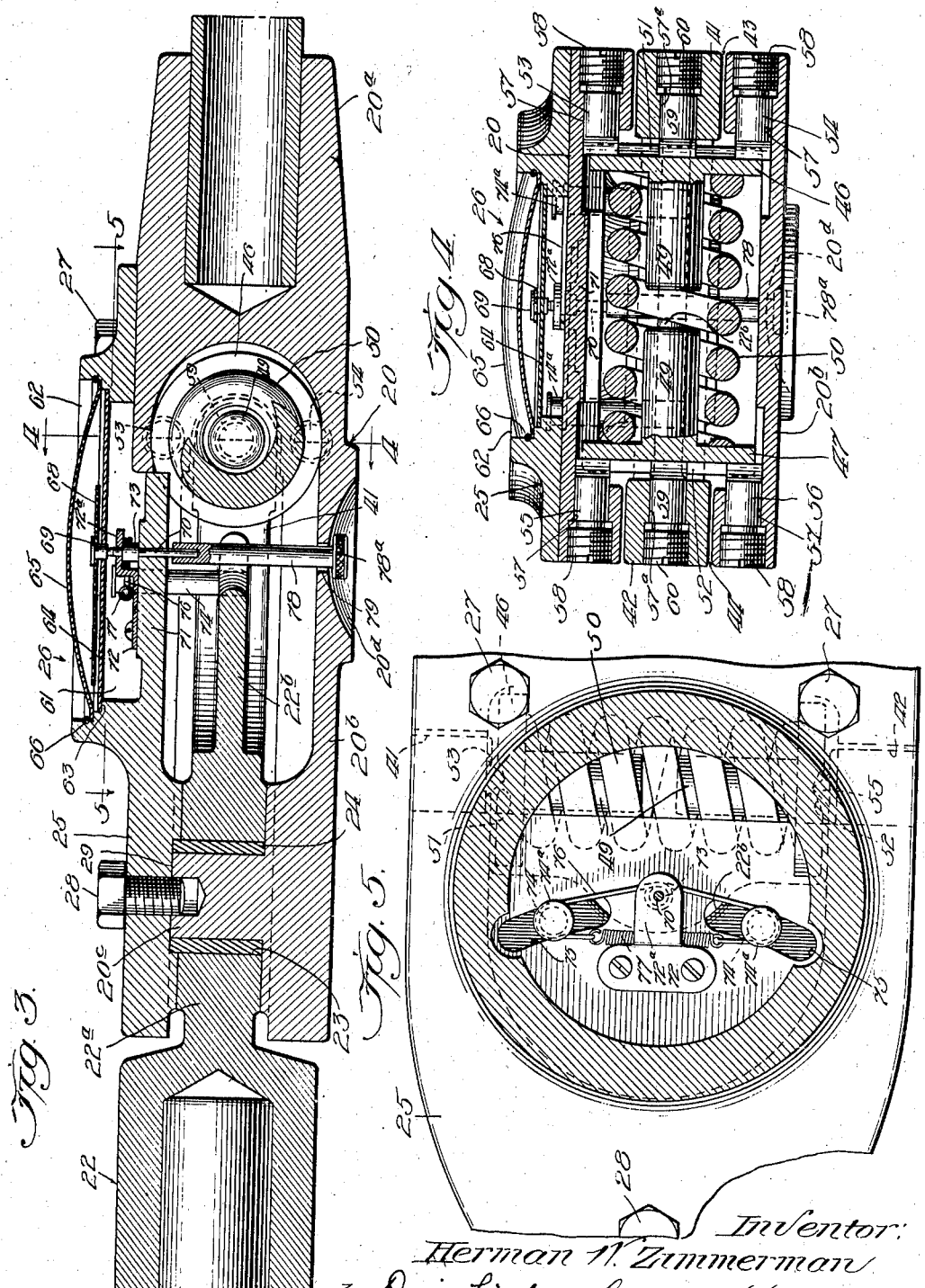

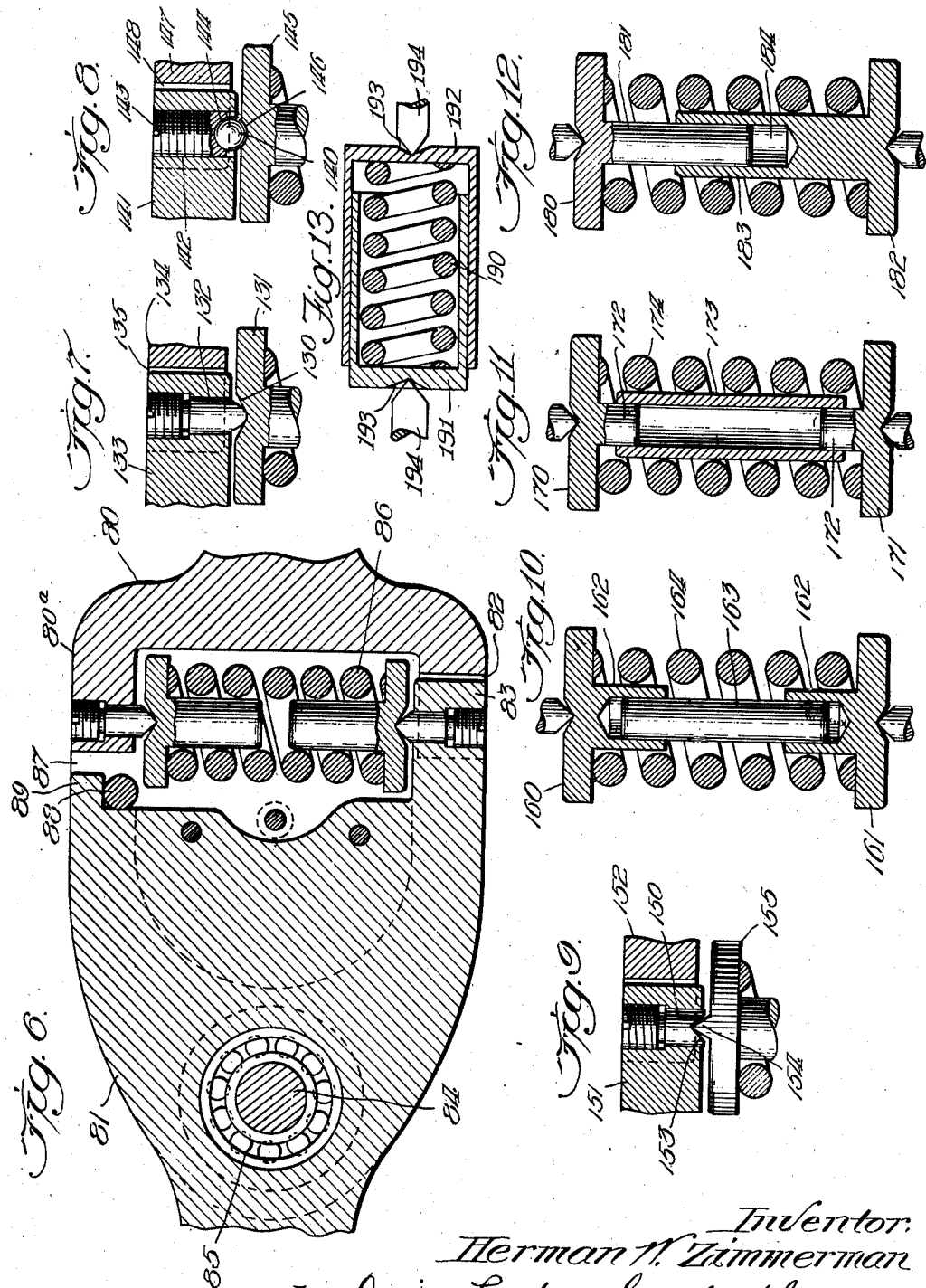

2,206,315

UNITED STATES PATENT OFFICE 2,206,315

TORQUE MEASURING WRENCH

Herman W. Zimmerman, Highland Park, Ill., assignor, by mesne assignments, to Automotive Maintenance Machinery Co., North Chicago, Ill., a corporation of Illinois Application June 21, 1937, Serial No. 149,333

16 Claims. (Cl. 265—1)

My invention relates to wrenches, and it has to do particularly with wrenches adapted for measuring the force or torque applied therethrough to nuts, bolts, studs, etc., which will be referred to hereinafter as "the work."

One of the objects of my invention is to provide an improved wrench of the foregoing character which is of simple and inexpensive construction, and which is adapted to perform its torque measuring function in a highly efficient manner.

Another object is to provide a precision wrench of the foregoing character with which the force or torque applied to the work may be measured with a high degree of accuracy.

A further object is to provide a torque measuring wrench which embodies but few parts and wherein friction between moving parts is reduced to the minimum, whereby the desired degree of accuracy may be uniformly and repeatedly attained in measuring the torque applied in tightening or loosening the work.

An additional object is to provide a durable wrench of the foregoing character having its parts so constructed and arranged that wear is reduced to the minimum and predetermined initial conditioning or setting of the wrench for torque measuring purposes may be maintained over long periods of use.

Other objects and advantages will become apparent as this description progresses, and by reference to the drawings, wherein:

Figure 1 is a top plan view of one form of wrench embodying my invention;

Fig. 2 is an enlarged fragmental and horizontal sectional view of the structure shown in Fig. 1;

Fig. 3 is a section taken substantially on line 3—3 of Fig. 2;

Fig. 4 is a section taken substantially on line 4—4 of Fig. 3;

Fig. 5 is a section taken substantially on line 5—5 of Fig. 3;

Fig. 6 is a horizontal sectional view similar to Fig. 2 and illustrating another form of wrench structure embodying my invention;

Figs. 7, 8 and 9 are fragmental sectional views of modified forms of anti-friction connections that may be employed in carrying out my invention;

Figs. 10, 11 and 12 are fragmental sectional views of modified forms of torque measuring spring structures that may be used in carrying out my invention; and Fig. 13 is a sectional view of another form of torque measuring spring structure that may be employed in carrying out my invention.

In carrying out my invention, I preferably employ relatively rockable wrench members, one of which is adapted to be associated with the work and the other of which is arranged to be actuated by the operator in tightening or loosening the work. Relative rock movement between these members is opposed, preferably (but not necessarily) by spring means which is adapted to yield when the work offers sufficient resistance to overcome the initial tension of the spring means and permit relative rocking of the wrench members, which relative rocking is measured in terms of inch-pounds pressure applied to the work. Further, according to my invention, I reduce the friction between the moving parts of the wrench to the very minimum so that the torque applied through the wrench to the work may be measured with a high degree of accuracy and the wrench may perform its torque measuring function accurately, from time to time, when applied to the same or different pieces of work. This latter feature is carried out in such a way as to reduce wear to the minimum, whereby a wrench embodying my invention, once initially set to take care of a certain torque measuring condition, will remain substantially indefinitely in condition for taking care of the same.

Referring particularly to the structure shown in Figs. 1 to 5, inclusive, it includes a supporting member 20 (Figs. 1–3) having a substantially thick end portion 20ª from the lower forward end of which projects a comparatively shallow ledge-like portion 20ᵇ which has an upstanding cylindrical rock lug 20ᶜ at its forward end. A handle 21 is secured to the rear end of the member portion 20ª, and this handle is adapted to be grasped by the operator to actuate the wrench to tighten or loosen the work. A shank member 22 is rockably supported by the member 20. Specifically, the rear end of the shank member 22 (Fig. 2) is provided with a rearwardly extending plate-like portion 22ª having a web-like end part 22ᵇ projecting into close proximity to the forward end of the member portion 20ª. The plate-like portion 22ª is provided with an opening 23 extending therethrough at right angles to the horizontal plane thereof with its center line so located that it is aligned with the axis of the shank member 22. An anti-friction bearing 24 of any suitable kind is fitted in the opening 23 and the upstanding rock lug 20ᶜ of the member 20 is received therein to rockably connect the member 22. The members 20 and 22 are held in the position just described (Fig. 3) by an upper detachable cover-plate 25 which supports gage structure 26 that will be described in greater detail hereinafter. The cover-plate 25 is secured to the member 20 by threaded studs 27 engaging the member portion 20ª and a threaded stud 28 passing therethrough and engaging the pivot lug 20ᶜ. The under side of the member 25 is provided with a shallow cylindrical recess 29 in which the upper end of the rock lug 20ᶜ is received. This recess is of sufficient diameter and the anti-friction bearing 24 is of sufficient length to project into and fit snugly but rotatably within such recess; and, in this way, the members 22 and 20 are rotatably connected for rock movement without any material looseness or play therebetween and, at the same time, with the rockable parts so related that they offer a minimum of friction in the rocking movement.

The forward end of the shank member 22 is provided with a work engaging member which may take any suitable form. For this purpose I may use an adapter device 30 to which I may connect any suitable socket or adapter element (not shown) adapted to operatively connect the shank 22 to the work.

Relative rock movement between the members 20 and 22 is yieldably opposed by spring means which will now be described. The space between the cover-plate 25 (Figs. 2-4) and the shelf-like portion 20ᵇ and in which the shank member portion 22ª rocks, is open at its sides so that the shank portion 22ª, which is of substantially the same width as the cover-plate 25 and portion 20ᵇ, is free to rock in either direction relatively to the member 20. The sides of the shank portion 22ª are extended toward the member portion 20ª to provide similar arms 41 and 42 at opposite sides of such shank portion. The opposite sides of the member portion 20ª at its forward end are provided with slots 43 and 44 (Figs. 2-4) which are so located and are of such size as to freely receive the end portions of the arms 41 and 42. The slots 43 and 44 are of a width only slightly less than the width of the arms 41 and 42, and, inwardly of these slots, the member portion 20ª is provided with a parti-cylindrical and laterally extending recess 45 opening at its forward end into the space between the cover-plate member 25 and member portion 20ᵇ. This parti-cylindrical chamber is so located and it is of such diameter or width that it extends inwardly beyond the inner ends of the slots 43 and 44 and outwardly beyond the opposite sides thereof.

A floating spring unit is mounted within the recess 45 and it is so associated with the rockable members 20 and 22 that it opposes relative rock movement thereof. Specifically, this spring unit includes a pair of similar and opposed follower members 46 and 47 (Figs. 2 and 4) each having a cylindrical head 48 of greater diameter than the width and length of the slots 43 and 44. Each follower is provided with an axially projecting stem 49 which is received within the opposite ends of a coil spring 50 which is, in turn, mounted between the follower heads 48. The follower stems 49 are of such length that, when the spring 50 is compressed to approximately its safe compression point, such followers will abut and prevent further compression of the spring, thereby avoiding over-compression of the spring which, if it should occur, would tend to distort the same with resultant failure of the device to properly measure the torque applied.

The followers 46 and 47 in the normal, at-rest position of the device, are confined between and operatively supported by the adjacent end surfaces of the parti-cylindrical recess 45. This engagement is accomplished through anti-friction means which permits the spring structure to rock as a unit with a minimum of friction when relative rock movement between the members 20 and 22 takes place. To this end, the outer faces of the followers 46 and 47 (Figs. 2 and 4) are provided with V-shaped notches 51 and 52, respectively, and these notches extend vertically throughout the width of the followers in a direction substantially parallel with the axis of the rock lug 20ᶜ. Pins 53, 54 and 55, 56 are supported by the member portion 20ª at the opposite ends of the parti-cylindrical recess 45 and both above and below the side slots 43 and 44. The forward ends of these pins are wedge-shaped, and they are so vertically aligned with the V-shaped notches 51 and 52 in the followers 46 and 47 that their apexes seat in the bottoms of such notches. The side walls of the V-shaped notches 51 and 52 are disposed at a greater angle from the vertical than the sides of the wedge ends of the pins 53 to 56 (Fig. 2) so that the pins engage the followers near diametrically opposed edges thereof along a substantially line contact and the followers are free to rock to a substantial extent about the pins 53, 54 and 55, 56 along such line contact, thereby reducing friction at this point to the minimum. In the normal, at-rest position of the wrench, the spring 50 is, preferably, under a predetermined initial tension, holding the followers 46 and 47 in the above-described engagement with the pins 53, 54 and 55, 56, respectively. The pins in question are adjustable so as to properly determine the initial tension of the spring and to also insure the proper aligned engagement thereof with the followers. Specifically, the member portion 20ª (Figs. 2 and 4) is provided with a plurality of openings 57 on the opposite sides of the slots 43 and 44, and the inner portions of these openings are of such size and length as to snugly and slidably receive the pins 53 to 56. The outer ends of the openings 57 are slightly enlarged and threaded to receive a screw plug 58. The outer ends of the pins 53, etc., are provided with a reduced end portion projecting into the outer enlarged part of the openings where they are engaged by the screw plug 58. By adjusting the screw plugs 58, the pins 53, etc., may be adjusted inwardly or outwardly to properly align the pins and the followers 46 and 47 with each other and to also adjust the initial tension of the spring 50.

The spring structure just described is operatively connected to the arms 41 and 42 of the shank portion 22ª by anti-friction means similar to the pins 53, etc., already described. More particularly, each arm 41, 42 is provided with a central opening 57ª similar to the openings 57 in the portion 20ª. Pins 59 similar to the pins 53, etc., are snugly mounted in the inner or reduced portions of the openings 57ª, and screw plugs 60 are received in the outer and enlarged portions of such openings. The pins 59 project inwardly from the inner surfaces of the arms 41, 42 and engage in the V-notches 51, 52 of the followers 46 and 47 similarly to and between the respective sets of pins 53, 54 and 55, 56. The pins 59 are adjusted by the plugs 60 to firmly engage in the respective V-notches 51, 52 in the normal, at-rest position of the wrench so that any tendency of the shank portion 22ª and arms 41, 42 to rock in either direction relatively to the member 20 will be yieldingly opposed by the spring structure.

In the use of the structure so far described, assuming that the work is to be tightened, the adapter device 30 (Fig. 1) is connected to the work and the wrench is moved in a clockwise direction by means of the handle 21. So long as the resistance offered by the work is not sufficient to overcome the initial tension of the spring 50, the members 20 and 22 remain in their normal, at-rest position (Figs. 1 and 2) with the followers 46 and 47 seated against the pins carried both by the portion 20ª and by the arms 41, 42. However, as soon as the work offers sufficient resistance to overcome the initial tension of the spring, the shank member 22 will tend to remain stationary while the member 20 will tend to rock clockwise relative to the shank member. This action is permitted through the compression of the spring 50 and, as it takes place, the arm 41 rocks outwardly, so to speak, away from the follower 46, leaving such follower supported by the pins 53 and 54, at that side of the wrench. At the other side of the wrench, the arm 42 moves inwardly, so to speak, moving the follower 47 away from the pins 55 and 56 so that that end is supported solely by the pin 59 carried by the arm 42. As the members rock and the arms move in a general arcuate path, the line contacts afforded by the several pins engaging the followers 46 and 47 compensate for such movement by permitting the spring unit to rock bodily about the respectively engaged pins about a line substantially parallel with the rock axis of the members 20 and 22. In this way, any cocking action of the spring that might tend to set up a restriction or resistance that would tend to give a fictitious torque measurement is avoided. The followers 46 and 47 and spring 50 remain in axial alignment at all times, and the moving parts that are involved are so related that friction is reduced to the minimum, thereby insuring an accurate recording action by the indicating mechanism which will be described hereinafter.

When the wrench is moved in a counterclockwise direction to loosen the work, for example, the foregoing operation is reversed. When sufficient pressure is applied to compress the spring 50, the arm 42 is disengaged from the spring unit and the follower 47 is supported solely by the pins 55 and 56. The follower 46 is displaced from the pins 53 and 54 and it is supported solely by the pin 59 carried by arm 41, which is moved relatively inward of the recess 45, so to speak. The spring unit pivots in exactly the same manner as described with the tightening operation.

The spring 50 is so constructed and related to the rockable members 20 and 22 that the extent of rock movement of such members indicates the amount of torque applied in tightening or loosening the work in terms of, preferably, inch-pounds pressure applied. The extent of this rock movement may be measured, as hereinabove mentioned, by the indicating structure 26 (Figs. 3-5, inclusive). Specifically, the upper portion of the cover-plate 25 is provided with a well 61 having an upper or outer enlarged portion 62 forming a shoulder 63 upon which is mounted a dial 64. The dial 64 is covered by a transparent shield 65 retained in place by a snap ring 66. The dial is provided with a scale 67 (Fig. 1) which is calibrated to register inch-pounds pressure. The gage mechanism is further provided with a rotatable hand or pointer 68 which moves relative to the scale 67 as relative rock movement between the members 20 and 22 takes place. The gage hand 68 is rigidly supported by a member 69 (Fig. 3) rotatably mounted in the dial 64 and carried by the upper end of a shaft 70. The shaft 70 is rotatably supported in bearings formed in the bottom 71 of the well 61 and in the upwardly spaced leg 72ª of a bracket 72 carried by the well bottom 71. The shaft 70, intermediate the bracket leg 72ª and the well bottom 71, is provided with a pulley or sheave 73 which is operatively connected to the web portion 22ᵇ of the shank member 22. More particularly, the web portion 22ᵇ is provided with upstanding pins 74 positioned on the opposite sides of the sheave 73. These pins are long enough to project upwardly through aligned, elongated slots 75 in the well bottom 71, which slots are of arcuate shape and are of such length as to accommodate relative rock movement between the members 20 and 22 without engagement between the pins and the walls of such slots. The upper ends of the pins 74 are provided with cylindrical, grooved heads 74ª horizontally aligned with the sheave 73 and connected to the latter by a cable 76 formed preferably of a non-elastic fabric material. The cable 76 is looped around the sheave and its opposite ends are passed around the cylindrical heads 74ª within the grooves thereof where they are connected by a spring 77 which maintains the cable 76 in a predetermined taut engagement with the pin heads 74ª and the sheave 73. It will be seen from the foregoing that, as relative rock movement between the members 20 and 22 takes place in tightening the work, the sheave 73 will be rotated in one direction, thereby rotating the gage head 68 in a similar direction relative to the gage scale 67. The relation of the parts just described is such as to considerably amplify the relative rock movement of the members so that the gage hand 68 will move a considerable distance upon slight rock movement of the members to readily and quickly indicate to the operator the pressure being applied through the wrench to the work. When the wrench is operated in the opposite direction, as in loosening the work, the parts already described operate in a manner opposite to that above described.

It is desirable that the gage hand be independently adjustable relative to the dial scale 67 in order to insure accuracy in the recording action of the gage mechanism at all times. To this end, the gage shaft 70 is extended downwardly through the well bottom 71 into the space between the cover-plate 25 and the member portion 20ᵇ where it is fixedly engaged with the inner end of a stem member 78. This stem member 78 (Fig. 3) is long enough to extend downwardly past the web portion 22ᵇ and fully through an opening 79 in the member portion 20ᵇ where it is provided with a finger-piece 78ª. The outer or bottom surface of the portion 20ᵇ is provided with a well 20ᵈ and the combined length of the stem member 78 and its finger-piece 78ª is such that the latter is disposed entirely within the well 20ᵇ. In this way the finger-piece 78ª is exposed so that it may readily be grasped by the operator while it is protected sufficiently to prevent it from being accidentally moved in the handling of the wrench. To reset the gage hand 68, it is only necessary to hold the members 20 and 22 stationary while turning the stem member 78 to, in turn, rotate the shaft and gage hand relative to the dial scale 67.

My invention is adaptable not only to double-acting wrenches of a character such as that just described, but also to single-acting wrenches wherein the torque measuring action is carried out only during the tightening of the work. One form of single-acting device embodying my invention is shown in Fig. 6, and it includes a pair of relatively rockable members 80 and 81 corresponding to the members 20 and 22 of the first form. The member 80 is similar to the member 20 except that it is provided with only one slot 82 corresponding to the slot 44 (Fig. 2), and the member 81 is provided with only one arm 83 corresponding to the arm 42 (Fig. 2). The members 80 and 81 are rockably connected by an upstanding rock lug 84 on the member 80, and a roller bearing 85 is used in place of the anti-friction bearing 24 (Fig. 3) for reducing to the minimum the friction between the rocking members at their point of connection. If desired, roller pins might well be substituted for the roller bearing 85. In this form, when the structure is moved in a clockwise direction to tighten the work, and when the work offers sufficient resistance to overcome the initial tension of the compression spring 86, the parts rock relatively in the manner described in connection with the first form and the spring 86 and its associated parts function in the manner already described. Gage mechanism similar to the gage mechanism 26 (Fig. 3) may be employed in this form for registering the extent of rock movement in terms of inch-pounds pressure applied to the work.

When the wrench structure is actuated in a counterclockwise direction, as when loosening the work, the structure operates as a rigid unit and the torque measuring feature is inactive. To this end, the lower, forwardly extending and shallow bottom portion 87 of the member 80 is provided, on its side opposite the slot 82 and just forwardly of the member portion 80ª, with an upstanding stop pin 88. The member 81 on its side adjacent the pin 88 is provided with a short, forwardly extending lug 89, the inner side of which abuts the pin 88 in the normal, at-rest position of the wrench parts. The lug and pin engagement just mentioned holds the spring 86 in its normal, at-rest position and, when the wrench is moved to tighten the work and the parts rocked relatively, the lug 89 moves away from the pin 88. However, when the wrench is moved in the opposite direction, from a position of rest, the engagement between the pin 88 and lug 89 affords a rigid connection between the rock members 80 and 81 so that the spring 86 is inactive and no movement of the parts can take place.

The anti-friction connection between the rockable members and the spring mechanism may take various other forms, such, for example, as those shown in Figs. 7, 8 and 9. The structure shown in Fig. 7 is similar to that employed in connection with the first form except that the notches 130 of the spring followers 131 have rounded apexes and the pins 132 carried by the rockable arms 133 (only one shown) have rounded ends to fit within the notches 130. The ends of the pins 132 may be of general wedge shape with their sides extending at a lesser angle from the vertical than the tapered sides of the notch 130. Pins (not shown) similar to the pin 132 are supported by the body member 134 on the opposite sides of the slot 135, and these pins are located similarly to the pins 53 to 56, inclusive (Fig. 4) of the first form. The pins just described serve the same purpose as the pins of the previously-described form, and the structure operates in substantially the same manner with a minimum of friction between the moving parts.

The structure shown in Fig. 8 is the same as that previously described except that balls 140 (only one shown) are substituted for the pins which support the followers of the spring mechanism. More particularly, in this form, the rockable arms 141 (only one shown) are each provided with an opening 142 in which is received a threaded plug 143. The forward end of the plug 143 is provided with a parti-spherical opening 144 providing a seat for the ball 140. The outer face of the spring follower 145 is provided with an aligned parti-spherical recess 146 in which the surface of the ball opposite the seat 144 is received. The follower recess 146 is quite shallow as compared to the plug recess 144 so that relative movement between the rockable parts and the spring mechanism takes place with a minimum of friction. It will be understood that the follower recess 146 extends throughout the width of the outer face thereof and that balls similar to the ball 140 are located in the body member 147 on opposite sides of the arm slot 148 in engagement with the follower recess 146 similarly to the pins 53 to 66, inclusive, of the first-described form.

In Fig. 9, I have shown an anti-friction arrangement which is the same as that of Figs. 1 to 5, inclusive, except that the anti-friction engaging parts are reversed. That is to say, the plugs 150 (only one shown) carried by the arm 151 in the body member 152 are provided with V-shaped notches 153 in which a diametrical rib 154 in the outer face of the spring follower 155 is received. Except for this reversal of parts, the structure of Fig. 9 is identical with that of Figs. 1 to 5, inclusive.

In certain instances it may be desirable to interlock the followers of the spring mechanism in such a way as to positively maintain a fixed relationship between the followers during rock movements of the wrench members. Arrangements by which this may be accomplished are shown in Figs. 10 to 12, inclusive, and 13. In Fig. 10, the inner faces of the opposed followers 160, 161 are provided with axial, tubular extensions 162, in which are freely and slidably received the opposite ends of a connecting pin 163. The pin 163 is of such length that its opposite ends firmly engage the inner ends of the tubular extensions 162 when the followers 160, 161 are moved together to an extent wherein the spring 164 is in its safely compressed condition. In this way, the spring mechanism as a whole is maintained in proper alignment during the operation of the wrench, and distortion of the spring 164 is avoided. Other than just described, the structure of Fig. 10 may be similar to the forms of Figs. 1 to 6, inclusive.

The structure shown in Fig. 11 is the same as that of Fig. 10 except that the spring followers 170, 171 are provided on their inner faces with axially extending cylindrical lugs 172 which are received in the opposite ends of a guide-stop tube 173. The tube 173 functions similarly to the pin 163 (Fig. 10) to hold the followers 170, 171 in proper alignment and to prevent over-compression of the spring 174.

The structure shown in Fig. 12 is similar to the structures of Figs. 10 and 11 except that the spring follower 180 is provided on its inner face with a cylindrical and axially disposed lug 181, while the follower 182 is provided on its inner face with an axial, tubular extension 183 in which the lug 181 is received. It will be seen that by thus connecting the followers 180 and 182, the spring mechanism is maintained in proper alignment during the operation of the wrench. The length of the lug 181 and the depth of the opening 184 in the extension 183 are such that movement of the followers 180 and 182 together to compress the spring is stopped when the full and safe compression of the spring is reached, thereby avoiding overcompression and consequent distortion of the same.

The structure shown in Fig. 13 is somewhat similar to that shown in Fig. 12 except that the extensions on the spring supporting devices enclose the spring member. Specifically, this structure includes a spring unit embodying a coil spring 190 supported at its opposite ends by telescoping tubular members 191 and 192. The length of the tubular wall of the member 191, which is received within the tubular wall of the member 192, is of such length that, when a predetermined, full and safe compression of the spring 190 is reached, it will abut the inner closed end surface of the member 192 and prevent further compression of the spring. The outer end surface of each of the members 191 and 192 is provided with a notch 193 similar to the notches 51, 52 of Fig. 2, for the reception of pins 194 having wedge-shaped end portions similarly to the connecting pins 53 to 56, inclusive, of Fig. 4. Other than just described, the construction and operation of this form may be similar to either of the previously described forms of Figs. 1 and 6.

It is believed that the operation and advantages of my invention will be readily appreciated from the foregoing description. In following my invention, a precision type of wrench is provided. The force or torque applied through the wrench to the work may be measured with a high degree of accuracy. By reducing friction between the parts to the minimum, wear is reduced and any original setting or conditioning of the wrench may be maintained over long periods of time, so that the wrench will at all times accurately and uniformly record the force or torque applied.

It is to be understood that while I have shown and described several forms of structure embodying my invention, other changes in details and arrangement of parts may be resorted to without departing from the spirit and scope of my invention as defined by the claims that follow.

I claim:

1. A torque measuring wrench comprising a member having provision for operative engagement with the work, another member to which pressure is applied by the operator, means for rockably connecting said members together, floating spring means between said members including a free-acting spring yieldably opposing relative rock movement of said members, a spring supporting device, supporting an end of said spring, and anti-friction means carried by said members and engaged with said supporting device, and means for measuring the extent of relative rock movement of said members in terms of pressure applied to the work through said members.

2. A torque measuring wrench comprising one member having provision for engagement with the work, a second member through which pressure is applied to said first member and the work by the operator, means for connecting said members for relative rock movement, means for opposing relative rock movement of said members including a free-acting spring, a follower device supporting each end of said spring, follower supporting devices carried by one of said members at the opposite ends of said spring, follower actuating devices carried by the other of said members at the opposite ends of said spring, anti-friction elements between and operatively connecting said follower devices with said supporting and actuating devices, and means for measuring the extent of relative rock movement of said members in terms of pressure applied to the work through said members.

3. A torque measuring wrench comprising one member having provision for engagement with the work, a second member through which pressure is applied to said first member and the work by the operator, means for connecting said members for relative rock movement, means for opposing relative rock movement of said members including a free-acting spring, a follower device supporting each end of said spring and having a diametrical V-shaped notch therein, follower supporting devices carried by one of said members at opposite ends of said spring and having wedge-shaped end portions adapted to seat in said follower device notches, follower actuating devices carried by the other of said members at the opposite ends of said spring and having wedge-shaped end portions adapted to seat in said follower notches, and means for measuring the extent of relative rock movement of said members in terms of pressure applied to the work through said members.

4. A torque measuring wrench comprising a member having provision for engagement with the work, another member rockably connected thereto, means between said members displaceably opposing relative rock movement thereof, an adjustable pivotal connection between one of said members and one end of said opposing means for normally supporting the latter, an adjustable pivotal connection between the other of said members and said one end of said opposing means and actuating the latter to displace the same to permit relative rock movement of said members, and means for measuring the extent of rock movement of said members in terms of pressure applied to the work therethrough.

5. A torque measuring wrench comprising a member having provision for engagement with the work and also having spaced arm elements extending longitudinally thereof, another member rockably connected to said first member and adapted to be actuated by the operator to apply pressure to the work, a floating spring unit disposed between said two members and including a spring having supporting devices at opposite ends thereof, means carried by the second-mentioned one of said members engaging said supporting devices and normally supporting said spring unit, means carried by said arms and engaging said supporting devices for actuating the latter to compress said spring as said members are rocked relative to each other, the connections between said spring unit and said supporting and actuating connections being such as to permit said spring unit to shift axially and laterally as said members are rocked relatively to avoid distortion of said spring, and means for measuring the extent of relative rock movement of said members in terms indicating the pressure applied therethrough to the work.

6. A torque measuring wrench comprising a member having provision at one end for engagement with the work and spaced, longitudinally extending arms at its other end, another member adapted to be actuated by the operator to apply pressure to the work, anti-friction means rockably connecting said two members, a spring unit including a compressible spring and supporting devices at the opposite ends thereof for opposing relative rock movement of said members, and anti-friction means between the second-mentioned one of said members and said supporting devices for normally supporting said unit, anti-friction means between said arms and said supporting devices through which pressure is applied to said spring to compress the latter as said members rock relatively, and means for measuring the extent of rock movement of said members in a manner indicating the pressure applied therethrough to the work.

7. A torque measuring wrench comprising a member having provision at one end for engaging the work and having laterally spaced and longitudinally extending arms at its other end, another member adapted to be actuated by the operator to apply pressure to the work, means rockably connecting said members, a floating spring unit including a compressible spring and supporting devices at the end thereof disposed between said members in alignment with said arms, pivotal means carried by the second-mentioned one of said members and rockably engaging said supporting devices for normally supporting said spring unit in the normal, at-rest condition of the wrench, pivotal means carried by said arms and also rockably engaging said supporting devices in alignment with said first pivotal means, whereby said spring unit may shift laterally with the minimum of friction between the moving parts as said members are rocked relatively and said spring is compressed and means for measuring the extent of said rock movement in terms of pressure applied therethrough to the work.

8. A torque measuring wrench comprising a member having provision for engagement with the work, another member adapted to be actuated by the operator to apply pressure to the work, means rockably connecting said members, a floating spring unit between said members for yieldably opposing relative rock movement thereof and including a spring having supporting devices at the opposite sides thereof, a pivotal connection between one of said members and said supporting devices for normally supporting said spring unit in the normal, at-rest position of the wrench parts, a pivotal connection between the other of said members and said supporting devices for actuating the latter to compress said spring as said members rock relatively, said pivotal connections permitting said spring unit to rock without distorting the same along the axis of said spring as said members rock relatively, and means for measuring the extent of rock movement of said members in terms of pressure applied therethrough to the work.

9. A torque measuring wrench comprising a member having provision at one end for engagement with the work and having laterally spaced and longitudinally extending arms at its other end, another member adapted at one end to be engaged and actuated by the operator to apply pressure to the work and having at its other end a bearing member with which the arm end of said first member is rockably engaged, said second member having slotted portions in which said arms move as said members rock relatively, means for securing said members together in said rockable relation, said members being relatively shaped to provide a space therebetween inwardly of the slotted portions of said second member, a floating spring unit disposed in said space and including a compressible spring with supporting devices at the opposite ends thereof aligned with said arms, pivotal means on the opposite sides of said slots at the opposite ends of said spring unit engaging said supporting devices and supporting said spring unit in the normal, at-rest condition of said wrench parts, pivotal means carried by said arms and engaging said supporting devices for engaging the latter to compress said spring as said members rock relatively, said pivotal means permitting said spring unit to rock about said pivotal supporting means at either end of said spring unit as said members rock relatively and dependent upon the direction of such movement, and means for measuring the extent of relative rock movement of said members to determine the amount of pressure applied therethrough to the work.

10. A torque measuring wrench comprising a member adapted to be engaged with the work, another member adapted to be actuated by the operator, means rockably connecting said members, a spring unit between said members yieldably opposing relative rock movement therebetween, said unit including a compression spring having end supporting devices, means pivotally connecting both of said members to said devices so that said unit opposes relative rock movement of said members in opposite directions, said means also permitting said unit to rock about said members without distortion of said spring angularly of its axis, and means for measuring the extent of rock movement of said members.

11. A torque measuring wrench comprising a pair of relatively rockable members, one of which is adapted to be engaged with the work, and the other is adapted to be actuated by the operator, means for rockably connecting said members, means yieldably opposing relative rock movement of said members, and means for measuring relative rock movement of said members including a dial member on one side of one of said members, a pointer movable relative to said dial, connections between said members and said pointer for moving the latter as said members rock relatively, said pointer being so associated with said connection that it is movable both with and relative thereto, whereby said pointer may be set to any predetermined initial position relative to said dial, and means for moving said pointer relative to said connections which includes an actuator connected with said pointer and extending through said dial carrying member to the opposite side thereof where it is accessible to the operator, said dial carrying member having a well therein into which the projecting end of said actuator extends, and said projecting end of said actuator being of less length than the depth of said well to avoid contact with said actuator in the normal use and storage of the wrench.

12. A torque measuring wrench comprising a member adapted for engagement with the work, another member adapted to be actuated by the operator for tightening or loosening the work, means for rockably connecting said members, and means for yieldably opposing relative rock movement of said members including a compression spring and devices at opposite ends thereof through which said spring is operably connected to said members, each of said devices having a tubular extension projecting inwardly and axially of said spring, and a stop pin having its opposite ends received in said tubular extensions and of such length that its ends are abutted by said devices when the spring is compressed to a predetermined extent wherein it reaches a predetermined point of compression.

13. A torque measuring wrench comprising a member adapted for engagement with the work, another member adapted to be actuated by the operator for tightening or loosening the work, means for rockably connecting said members, and means for yieldably opposing relative rock movement of said members including a compression spring and devices at opposite ends thereof through which said spring is operably connected to said members, each said device having an axial projection within and axially of said spring, and a sleeve member in which said projections are slidably received, said sleeve member being of such length that its ends are abutted by said devices when the spring is compressed to a predetermined and desired extent.

14. A torque measuring wrench comprising a member having provision for engagement with the work, a second member through which pressure is applied to the work, means rockably connecting said members, means between said members yieldably opposing relative rock movement thereof including a compression spring and a follower device at the end thereof, said follower device having an elongated diametrical groove therein, the bottom of which extends along a line substantially parallel with the rock axis of said members, connecting members on both said rockable members having wedge-shaped ends engaged in said groove along a substantial line contact, and means for measuring the relative rock movement of said rock members as permitted by said spring.

15. A torque measuring wrench comprising a member having provision for engagement with the work, a second member through which pressure is applied to the work, means rockably connecting said members, means between said members yieldably opposing relative rock movement thereof including a compression spring extending transversely of said members and a follower device at each end thereof, said follower devices each having an elongated groove therein, the bottom of which extends along a line substantially parallel with the rock axis of said members, connecting members in both said rockable members having wedge-shaped ends engaged in said groove along a substantial line contact, said connecting members being so arranged that they are vertically aligned and they engage said follower device near the opposite ends of and near the center of said groove, and means for measuring the relative rock movement of said rock members as permitted by said spring.

16. A torque measuring wrench comprising a body having a spring chamber therein, a member rockably supported by said body and having a part aligned with said chamber, a compressible spring in said chamber, a follower member associated with one end of said spring, pivotal connection means between said member part and said follower member and said body and said follower member, and means for measuring the rock movement of said body and rock member.

HERMAN W. ZIMMERMAN.